(12) United States Patent
Park et al.

(10) Patent No.: US 10,147,912 B2
(45) Date of Patent: Dec. 4, 2018

(54) METHOD FOR MANUFACTURING BATTERY CELL AND BATTERY MODULE

(71) Applicant: SK INNOVATION CO., LTD., Seoul (KR)

(72) Inventors: Heechan Park, Daejeon (KR); Sang Bum Kim, Seoul (KR)

(73) Assignee: SK Innovation Co., LTD., Seoul (KR)

( * ) Notice: Subject to any disclaimer, the term of this patent is extended or adjusted under 35 U.S.C. 154(b) by 281 days.

(21) Appl. No.: 15/070,764

(22) Filed: Mar. 15, 2016

(65) Prior Publication Data

US 2016/0197316 A1 Jul. 7, 2016

Related U.S. Application Data

(62) Division of application No. 13/403,261, filed on Feb. 23, 2012.

(30) Foreign Application Priority Data

Nov. 14, 2011 (KR) .................. 10-2011-0118226

(51) Int. Cl.
| | |
|---|---|
| *H01M 2/02* | (2006.01) |
| *H01M 2/12* | (2006.01) |
| *H01M 10/04* | (2006.01) |
| *H01M 2/10* | (2006.01) |
| *H01M 10/052* | (2010.01) |

(52) U.S. Cl.
CPC ....... *H01M 2/0212* (2013.01); *H01M 2/1241* (2013.01); *H01M 10/0436* (2013.01); *H01M 2/1061* (2013.01); *H01M 10/052* (2013.01); *Y10T 29/4911* (2015.01)

(58) Field of Classification Search
CPC combination set(s) only.
See application file for complete search history.

(56) References Cited

U.S. PATENT DOCUMENTS

2003/0232236 A1* 12/2003 Mitchell ............. H01M 2/0212
429/56
2011/0104527 A1* 5/2011 Choi ..................... H01M 2/024
429/53

FOREIGN PATENT DOCUMENTS

| JP | 2001-093483 | 4/2001 |
|---|---|---|
| JP | 2003-132868 | 5/2003 |
| JP | 2008-269851 | 11/2008 |
| JP | 2012-069497 | 4/2012 |

\* cited by examiner

*Primary Examiner* — Lisa S Park
(74) *Attorney, Agent, or Firm* — IP & T Group LLP (57) ABSTRACT

Provided are a battery cell and a battery module including the same. The battery cell is provided with a vent part, which is a predetermined region of a sealing part of a case having a width narrower than that of the other region thereof, thereby making it possible to easily discharge gas.

3 Claims, 8 Drawing Sheets

METHOD FOR MANUFACTURING BATTERY CELL AND BATTERY MODULE

CROSS-REFERENCE TO RELATED APPLICATIONS

This application is a division of U.S. patent. application Ser. No. 13/403,261 filed on Feb. 23, 2012, which claims priority under 35 U.S.C. § 119 to Korean Patent Application No. 10-2011-0118226, filed on Nov. 14, 2011. The disclosure of each of the foregoing application is incorporated herein by reference in its entirety.

TECHNICAL FIELD

The present invention relates to a battery cell for directly converting chemical energy into electrical energy and a battery module including the same, and more particularly, to a battery cell capable of easily discharging gas in a battery, and a battery module including the same.

BACKGROUND

Recently, as miniaturization and lightness of portable electronic devices have rapidly progressed, the necessity for miniaturization of a battery and an increase in capacity of the battery used as a driving power supply of the portable electronic devices has increased. Among others, a lithium secondary battery has an operation voltage of 3.6 V or more, which is three times higher than that of a nickel-cadmium battery or a nickel-hydrogen battery mainly used as a power supply of the portable electronic devices, and has high energy density per unit weight, such that the use of the lithium secondary battery has been rapidly extended.

The lithium secondary battery is mainly divided into a cylindrical battery, a square type battery, a pouch type battery, and the like, according to an appearance thereof, and is divided into a lithium ion battery, a lithium ion polymer battery, a lithium polymer battery, and the like, according to a form of an electrolyte solution.

Among them, the demand for the square type battery and the pouch type battery having a thin thickness has increased in accordance with the trend toward miniaturization of a mobile device. Particularly, the interest in the pouch type battery having an easily changed form, a low manufacturing cost, and light weight has increased.

Generally, the pouch type battery means a battery in which an electrode assembly and an electrolyte are sealed in a pouch type case of a laminate sheet configured to include a resin layer and a metal layer. The electrode assembly received in the case has a jelly roll type (winding type) structure or a stack type structure.

Meanwhile, in the pouch type secondary battery, operation potential of the battery is high, such that high energy may instantaneously flow, and cathode materials have chemical activity significantly increased due to overcharge or a short-circuit to rapidly react with an electrolyte, thereby generating a large amount of gas. As a result, the battery explodes due to a rapid increase in pressure or temperature in the battery, such that peripheral devices or a human body may be damaged.

Particularly, this problem may cause a more series large accident in the case of a middle or large-sized battery pack including a plurality of battery cells.

Since the middle or large-sized battery pack includes a plurality of battery cells or unit modules in a frame having a predetermined space, as the plurality of battery cells or unit modules are expanded, pressure in a case may be rapidly increased.

Due to the above-mentioned reason, an attempt to solve a stability problem of the secondary battery module has been continuously conducted. However, in most cases, a method of attaching a separate component or device is used, such that an additional process or equipment is required at the time of producing the battery, thereby decreasing productivity and energy density of the battery and increasing a production cost of the battery.

A battery cell disclosed in Korean Patent Laid-Open Publication No. 2004-0081521 is configured to include a case receiving a jelly-roll type (winding type) electrode assembly.

The battery cell according to the related art further includes a safety plate depressed from an outer side of the case to an inner side thereof.

In order to solve a problem that the battery explodes due to an increase in internal pressure or temperature, the battery cell according to the related art is provided with the safety plate broken at the time of an increase in the pressure to thereby be used as a path through which gas is discharged.

However, in the battery cell according to the related art, when the internal pressure increases, since a sealed portion of the case is first opened and the safety plate is then broken while stress is transferred up to a position at which the safety plate is formed, threshold internal pressure at which the safety plate is broken may not be controlled.

In addition, in the battery cell according to the related art, since the threshold internal pressure at which the safety plate is broken may not be concentrated, the battery cell may explode without break of the safety plate even in a state in which the safety plate does not withstand the internal pressure.

Therefore, the development of a technology capable of controlling pressure at which a case of a battery cell may be securely broken has been demanded.

RELATED ART DOCUMENT

Patent Document

Korean Patent Laid-Open Publication No. 2004-0081521 (Sep. 22, 2004)

SUMMARY

An embodiment of the present invention is directed to providing a battery cell capable of preventing a battery from exploding due to a rapid increase in internal pressure or temperature in the battery by forming a portion at which the internal pressure of the battery cell is concentrated, and a battery module including the same.

In one general aspect, a battery cell includes: a battery unit including a first electrode part, a second electrode part, and a separator; first and second electrode taps each welded to the first and second electrode parts; and a case having the first and second electrode taps protruded outwardly thereof, having a pouch form in which it is sealed while including the first electrode part, the second electrode part, and the separator in an inner portion thereof, and including a sealing part having a sealing member applied thereto and a vent part, which is a predetermined region of the sealing part having a width narrower than that of the other region thereof.

The sealing part of the case may be heat-fused and bonded by a pair of compression parts each provided with first and second grooves having a shape corresponding to that of the vent part.

In another general aspect, a battery module is formed by stacking the battery cell as described above in plural.

The vent part may be formed so that a predetermined region from an inner side of the case to an outer side thereof is not bonded.

The sealing part of the case may be heat-fused and bonded by a pair of compression parts each provided with first and second grooves having a shape corresponding to that of the vent part.

In still another general aspect, a battery module is formed by stacking the battery cell as described above in plural.

In still another general aspect, a method of manufacturing a battery cell includes: a manufacturing step of manufacturing a battery part including a first electrode part, a second electrode part, and a separator and welding each of first and second electrode taps to the first and second electrode parts; a receiving step of receiving a battery part in a case so that in which the first and second electrode taps are protruded outwardly; and a sealing step of heat-fusing and bonding a sealing part to which a sealing member is applied in the case to each other by a pair of compression parts provided with first and second grooves.

The sealing step may include: a disposing step of disposing each of the pair of compression parts at upper and lower sides of the sealing part so that the first and second grooves face each other; and a heat-fusing step of heat-fusing a portion at which the pair of compression parts contacts the sealing part to form a vent part, which is a predetermined region of the sealing part having a bonding width narrower than that of the other region thereof.

Other features and aspects will be apparent from the following detailed description, the drawings, and the claims.

[Detailed Description of Main Elements]

| | |
|---|---|
| 1000: Battery Cell | 100: Battery Part |
| 110: First Electrode Part | 120: Second Electrode Part |
| 130: Separator | 200: First Electrode Tap |
| 300: Second Electrode Tap | 400: Case |
| 410: Sealing Part | 420: Vent part |
| 500: Pair of Compression Part | 510: First Groove |
| 520: Second Groove | |
| L410: Width of Sealing Part | L420: Width of Vent part |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Hereinafter, the technical spirit of the present invention will be described in more detail with reference to the accompanying drawings.

Figure 1:
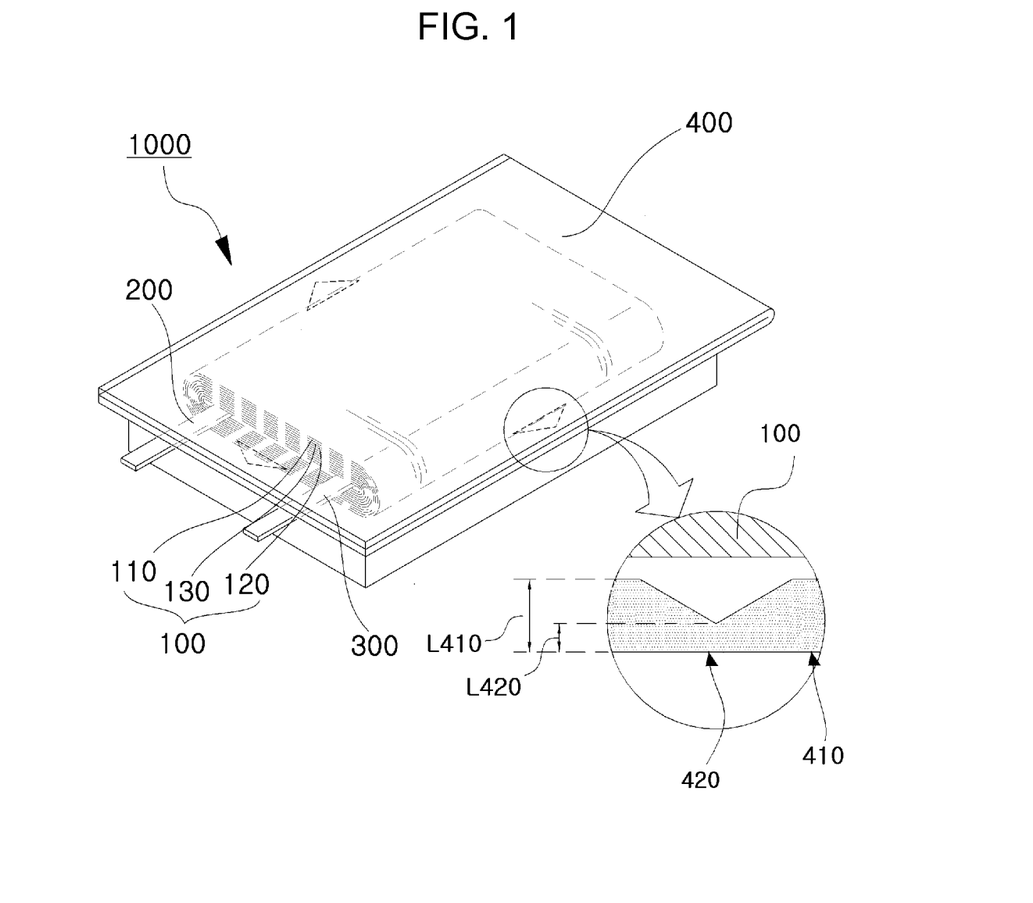
FIG. 1 is a perspective view of a battery cell according to an exemplary embodiment of the present invention.

FIG. 1 is a perspective view of a battery cell according to an exemplary embodiment of the present invention.

As shown in FIG. 1, the battery cell 1000 according to the exemplary embodiment of the present invention is configured to include a battery part 100, first and second electrode taps 200 and 300, and a case 400.

The battery part 100, which is a component provided in the case 400, is configured to include a first electrode part 110, a second electrode part 120, and a separator 130.

Here, the separator is provided between the first and second electrode parts 110 and 120, and the first electrode part 110, the second electrode part 120, and the separator 130 are provided, together with an electrolyte solution, in the case 400.

Each of the first and second electrode taps 200 and 300, which are components protruded outwardly of the case 400 so as to be connected to power supply, is welded to the first and second electrode parts 110 and 120.

The case 400, which is a basic body forming the battery cell 1000, is sealed in a pouch form and is configured to include a sealing part 410 and a vent part 420.

The sealing part 410 is a predetermined region to which a sealing member is applied in the case 400, and the case 400 is bonded by applying the sealing member to the sealing part 410, such that it is sealed in a pouch form.

Here, the sealing part 410 may be bonded by applying the sealing member thereto or be bonded by heat-fusing the region in which the sealing member is applied.

The vent part 420 is a region having a bonding width L420 narrower than a width L410 of the sealing part 410 region.

An enlarged view shown in FIG. 1 is a lateral cross-sectional view of a region in which the vent part 420 is formed. Referring to FIG. 1, the region in which the vent part 420 is formed has a width L420 narrower than the bonding width L410 of a predetermined region of the sealing unit 410.

That is, the vent part 420, which is a region having the bonding width L420 narrower than the bonding width L410 of the sealing part 410, is formed so that a predetermined region from an inner side of the case 400 to an outer side thereof is not bonded.

In this case, when internal pressure of the case 400 increases due to overcharge of the battery and battery module, overheat such as an internal short-circuit, or the like, stress is concentrated on the vent part 420.

When the stress is concentrated on the vent part 420, the case 400 is first opened at the inner side thereof based on the region of the vent part 420.

Therefore, the battery cell 1000 according to the exemplary embodiment of the present invention is provided with the vent part 420, which is a predetermined region having a bonding width L420 narrower than that of the other region in a bonding region of the case 400, to prevent explosion or ignition of the battery due to a rapid increase in internal pressure or temperature of the battery, thereby making it possible to ensure stability.

Figure 2A:
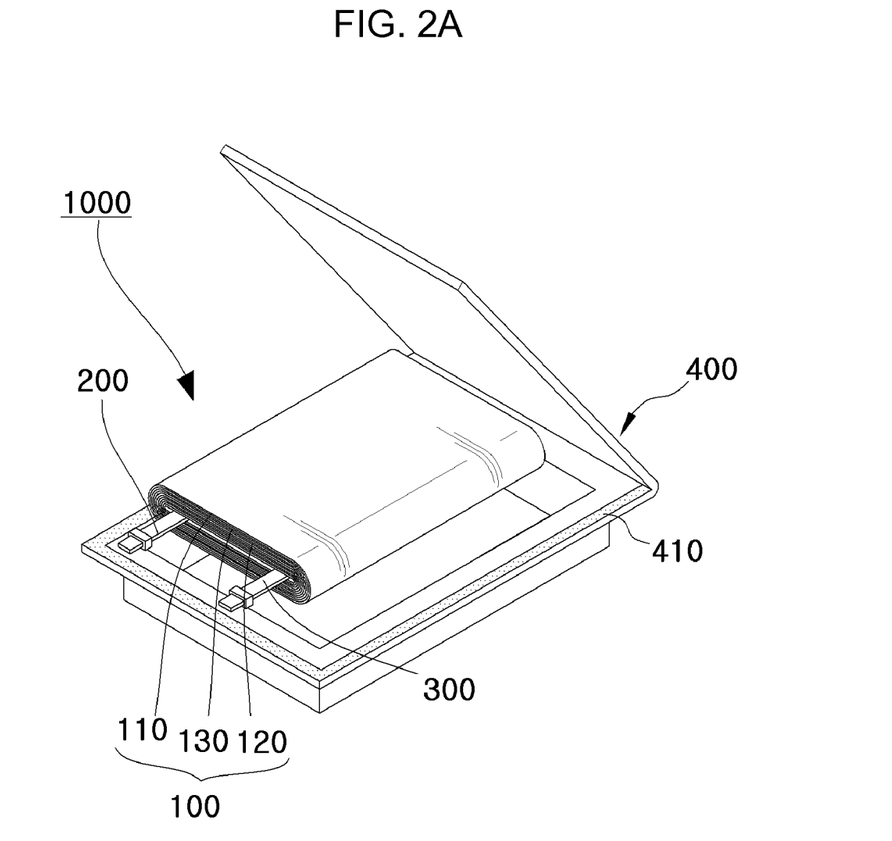
FIGS. 2A and 2D are perspective views showing a method of manufacturing a battery cell according to an exemplary embodiment of the present invention.
Figure 2B:
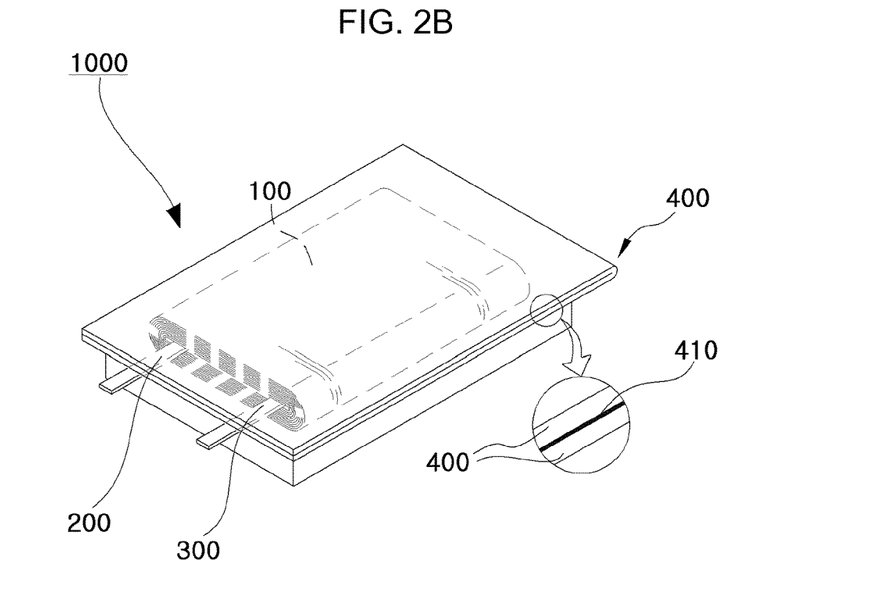
Figure 2C:
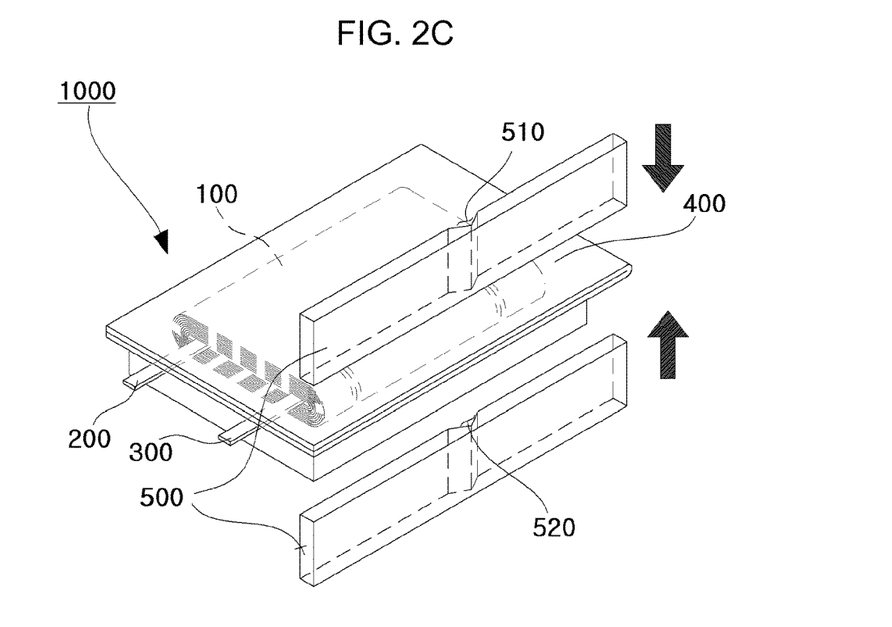
Figure 2D:
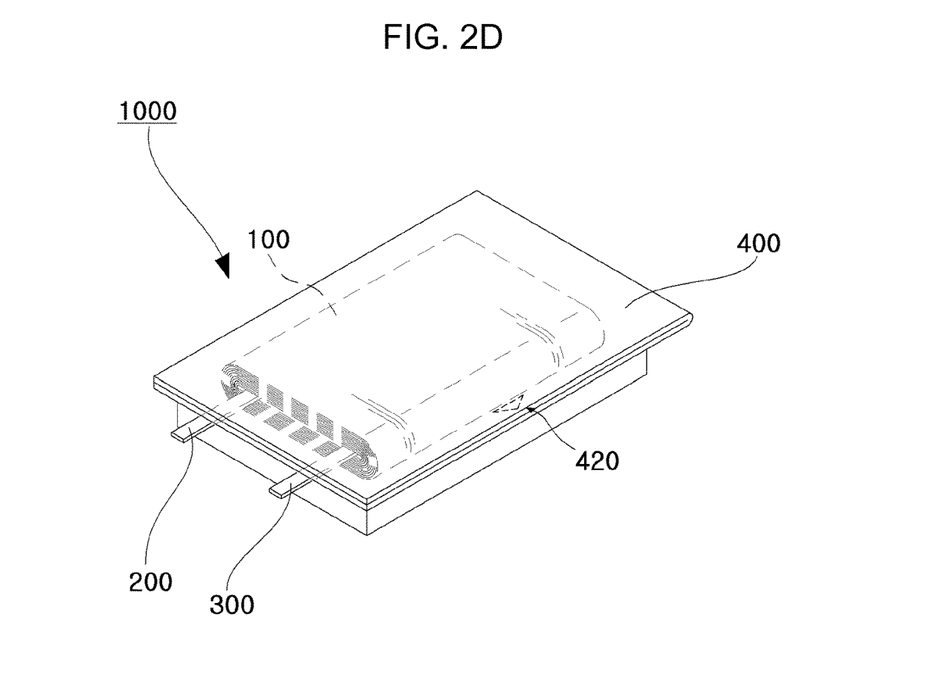
Figure 3A:
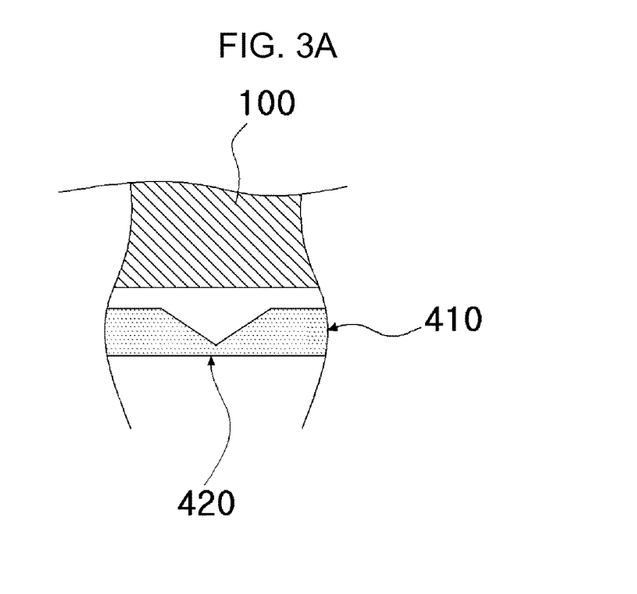
FIGS. 3A to 3G are views of several examples of a vent part according to an exemplary embodiment of the present invention.
Figure 3B:
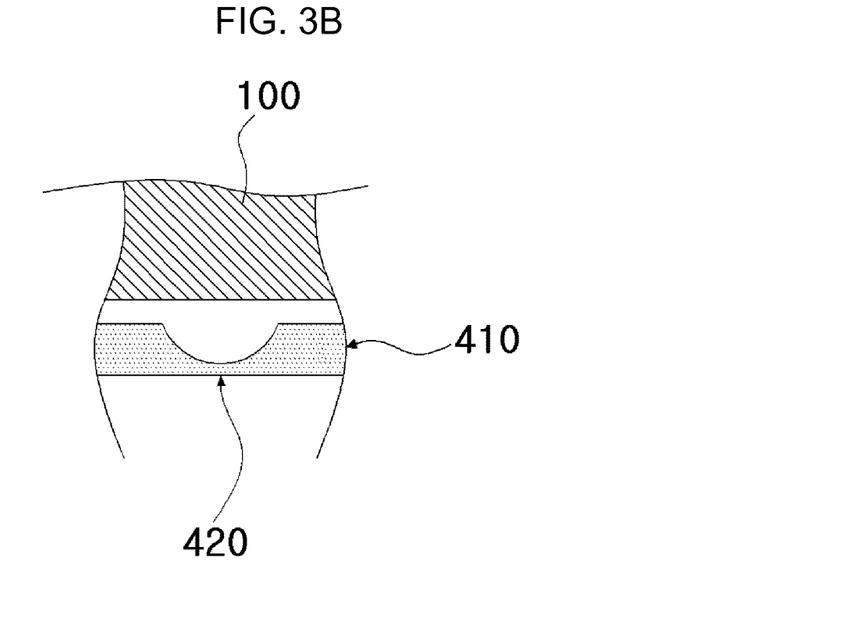
Figure 3C:
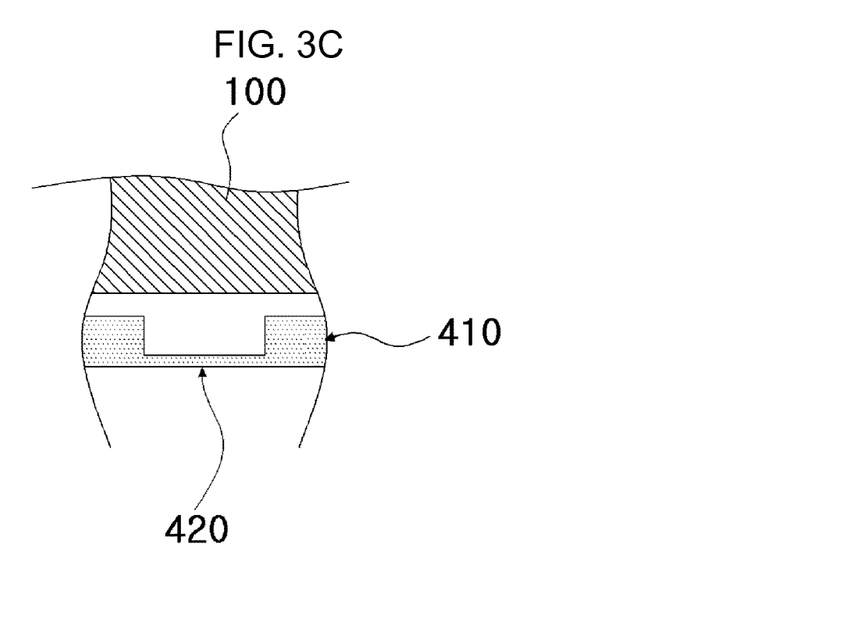
Figure 3D:
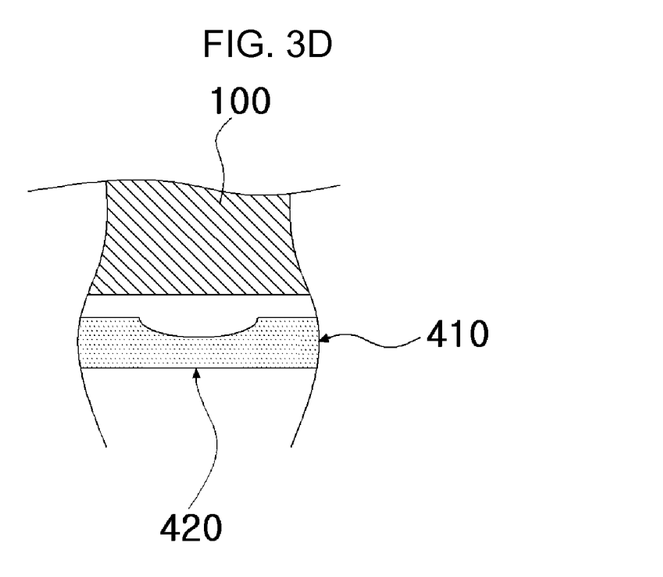
Figure 3E:
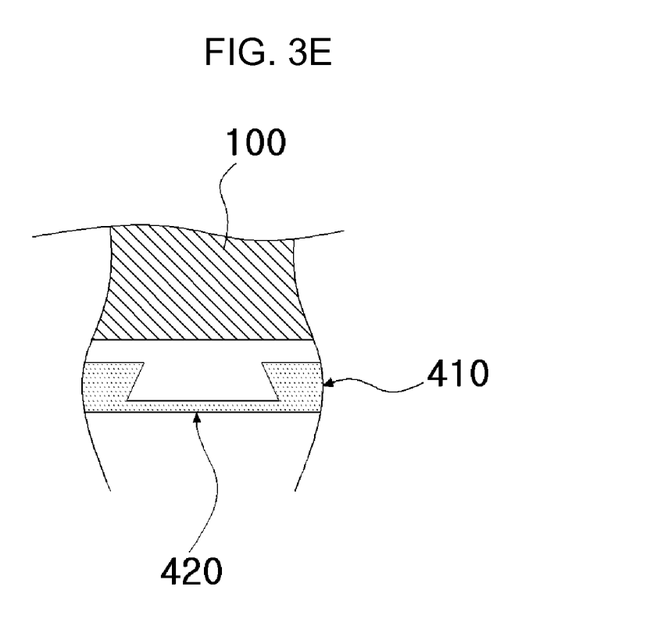
Figure 3F:
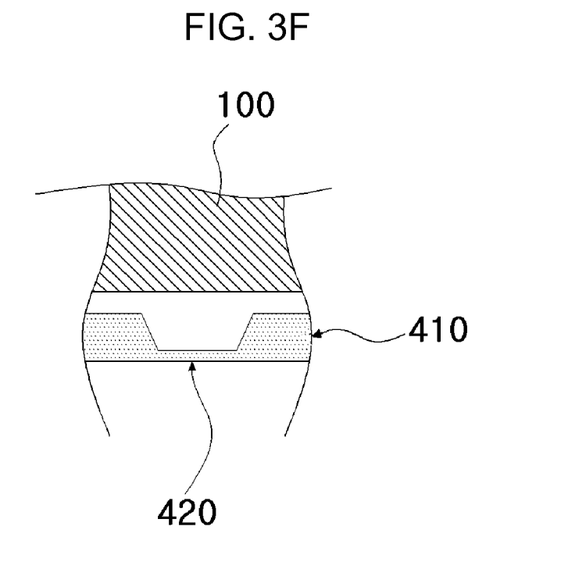
Figure 3G:
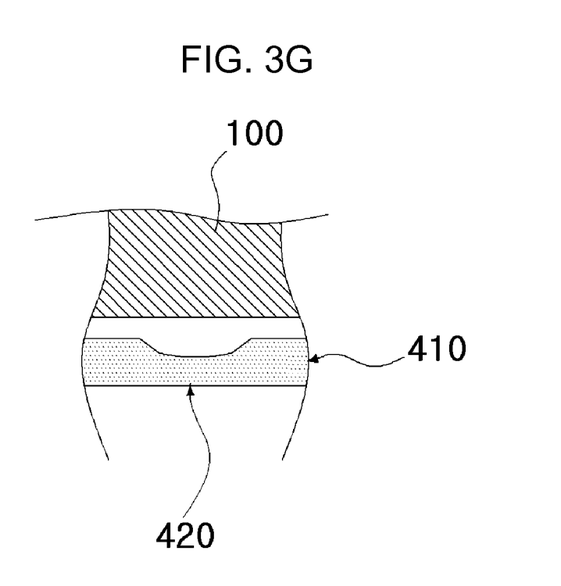

FIGS. 2A and 2D are perspective views showing a method of manufacturing a battery cell according to an exemplary embodiment of the present invention.

As shown in FIG. 2, the method of manufacturing a battery cell 1000 according to the exemplary embodiment of the present invention includes the following operations.

First, as shown in FIG. 2A, a battery part 100 including a first electrode part 110, a second electrode part 120, and a separator 130 is manufactured, and each of first and second electrode taps 200 and 300 is welded to the first and second electrode parts 110 and 120. This operation corresponds to a battery manufacturing operation.

Then, as shown in FIG. 2B, the battery part 100 is received in a case 400 so that the first and second electrode taps 200 and 300 are protruded outwardly of the case 400. This operation corresponds to a reception operation.

Next, as shown in FIGS. 2C to 2D, a sealing part 410 to which a sealing member is applied in the case 400 is heat-fused and bonded by a pair of compression parts 500 having first and second grooves 510 and 520 formed in each of one surfaces thereof. This operation corresponds to a sealing operation.

Here, the sealing operation may be divided into a disposing operation and a heat-fusing operation, which will be described in detail.

First, referring to FIG. 2C, one surfaces of the pair of compression parts 500 in which the first and second grooves 510 and 520 are formed are disposed at upper and lower sides of the sealing part 410 so as to face each other. This operation corresponds to a disposition operation.

Next, referring to FIG. 2D, a portion at which the pair of compression parts 500 contacts the sealing part 410 is heat-fused to form a vent part 420, which is a predetermined region of the sealing part 410 having a bonding width narrower than that of the other region thereof. This operation corresponds to a heat fusing operation.

Therefore, the battery cell 1000 according to the exemplary embodiment of the present invention includes the vent part 420 formed in a simple scheme by heat-fusing the sealing part of the case 400, such that it may be rapidly manufactured.

In addition, the battery module 1000 according to the exemplary embodiment of the present invention is formed by stacking a plurality of battery cells 1000.

FIGS. 3A to 3G are views of several examples of a vent part according to an exemplary embodiment of the present invention.

Referring to FIGS. 3A to 3G showing several examples of a vent part 420 based on a lateral cross section of a sealing part 410 in which the vent part 420 is formed, the vent part 420 is formed in a predetermined region of the sealing part 410 and has various shapes such as a triangular shape, a semicircular shape, a rectangular shape, an oval shape, and a trapezoidal shape based on a cross-sectional view taken along a side of the sealing part 410.

Figure 4:
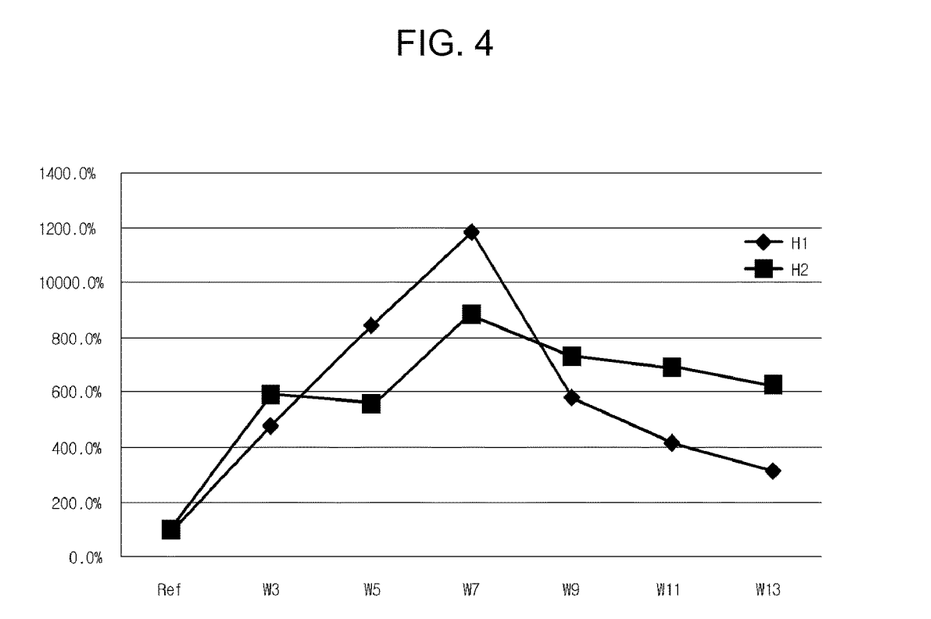
FIG. 4 is a graph showing stress concentration by a formation area of a vent part according to an exemplary embodiment of the present invention.

FIG. 4 is a graph showing stress concentration by a formation area of a vent part in the battery cell according to an exemplary embodiment of the present invention.

It may be appreciated from FIG. 4 that stress concentration transferred to the vent part 420 of the battery cell 1000 according to the exemplary embodiment of the present invention is changed according to a shape and a formation area of the vent part 420.

It may be appreciated that the stress concentration does not become high as the formation area of the vent part 420 increases, but is high in a predetermined area.

Therefore, the battery cell 1000 according to the exemplary embodiment of the present invention is provided with the vent part 420, which is a predetermined region having a bonding width narrower than that of the other region in a bonding region of the case 400, thereby making it possible to set pressure at which the case is opened due to explosion or ignition of the battery caused by a rapid increase in internal pressure or temperature of the battery.

As described above, the battery cell according to the exemplary embodiment of the present invention is provided with the vent part, which is a predetermined region having a bonding width narrower than that of the other region in a sealing region of the case, to prevent explosion or ignition of the battery due to a rapid increase in internal pressure or temperature of the battery, thereby making it possible to ensure stability.

Therefore, the battery cell according to the exemplary embodiment of the present invention includes the vent part formed in a simple scheme by heat-fusing the sealing part of the case, such that it may be rapidly manufactured.

In addition, the battery cell according to the exemplary embodiment of the present invention is provided with the vent part, which is a predetermined region having a bonding width narrower than that of the other region in a bonding region of the case, thereby making it possible to set pressure at which the case is opened due to explosion or ignition of the battery caused by a rapid increase in internal pressure or temperature of the battery.

However, the accompanying drawings are only examples shown in order to describe the technical idea of the present invention in more detail. Therefore, the technical idea of the present invention is not limited to shapes of the accompanying drawings.

The present invention is not limited to the above-mentioned exemplary embodiments, and may be variously applied, and may be variously modified without departing from the gist of the present invention claimed in the claims.

What is claimed is:

1. A method of manufacturing a battery cell, the method comprising:
placing a battery part between upper and lower case sheets;
applying a sealing member between the upper and the lower case sheets and around the battery part; placing the upper and the lower case sheets between a pair of compression parts, wherein at least one of the pair compression parts consists essentially of a first region having a first flat contact surface and a second region having a second flat contact surface, wherein a groove is formed in the first region so that the first flat contact surface has a narrower width than the second flat contact surface;

applying heat to the sealing member and pressing the sealing member between the pair of compression parts to form a sealing part between the upper and the lower case sheets, wherein the sealing part includes a first bonding region and a second bonding region corresponding to the first and second flat contact surfaces, respectively, wherein a vent part, which corresponds to the groove, is formed between the first bonding region and the battery part and between the upper and the lower case sheets, and the sealing part in the first bonding region has a narrower width than the sealing part in the second bonding region.

2. The method of claim 1, wherein the vent part has a triangular shape, a semi-circular shape, a rectangular shape, a semi-oval shape, a trapezoidal shape, or a combination thereof.

3. The method of claim 1, wherein a stress applied to the sealing part in the first bonding region is greater than a stress applied to the sealing part in the second bonding region under a given inner pressure condition.

* * * * *